United States Patent
Lum et al.

(10) Patent No.: US 9,230,362 B2
(45) Date of Patent: *Jan. 5, 2016

(54) SYSTEM, METHOD, AND COMPUTER PROGRAM PRODUCT FOR USING COMPRESSION WITH PROGRAMMABLE SAMPLE LOCATIONS

(71) Applicant: NVIDIA Corporation, Santa Clara, CA (US)

(72) Inventors: Eric B. Lum, San Jose, CA (US); Jeffrey Alan Bolz, Austin, TX (US); Rui Manuel Bastos, Porto Alegre (BR); Andrei Khodakovsky, Belmont, CA (US); Christian Johannes Amsinck, Cary, NC (US); Bengt-Olaf Schneider, Yorktown Heights, NY (US)

(73) Assignee: NVIDIA Corporation, Santa Clara, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/024,555

(22) Filed: Sep. 11, 2013

(65) Prior Publication Data
US 2015/0070380 A1 Mar. 12, 2015

(51) Int. Cl.
*G06T 15/50* (2011.01)
*G06T 15/00* (2011.01)

(52) U.S. Cl.
CPC .............. *G06T 15/503* (2013.01); *G06T 15/005* (2013.01)

(58) Field of Classification Search
CPC ........ G09G 5/02; G09G 5/022; G06T 11/001; G06T 11/40; G06T 2200/12; G06T 15/04; G06F 17/17
See application file for complete search history.

(56) References Cited

U.S. PATENT DOCUMENTS

| | | | |
|---|---|---|---|
| 6,466,206 B1 * | 10/2002 | Deering | 345/419 |
| 6,597,363 B1 | 7/2003 | Duluk, Jr. et al. | |
| 7,050,068 B1 | 5/2006 | Bastos et al. | |
| 7,126,615 B2 * | 10/2006 | Liao | 345/613 |
| 2003/0179199 A1 | 9/2003 | Deering et al. | |
| 2012/0013624 A1 * | 1/2012 | Fowler | 345/520 |
| 2014/0333662 A1 * | 11/2014 | Akenine-Moller et al. | 345/604 |
| 2015/0070381 A1 | 3/2015 | Lum et al. | |
| 2015/0138228 A1 | 5/2015 | Lum et al. | |

OTHER PUBLICATIONS

Burger, K.; Kruger, J.; Westermann, R., "Sample-Based Surface Coloring," Visualization and Computer Graphics, IEEE Transactions on, vol. 16, No. 5, pp. 763,776, Sep.-Oct. 2010. URL: http://ieeexplore.ieee.org/stamp/stamp.jsp?tp=&arnumber=5262943&isnumber=5506919.*
Non-Final Office Action from U.S. Appl. No. 14/082,038, dated May 4, 2015.
Non-Final Office Action from U.S. Appl. No. 14/024,558, dated May 12, 2015.
Non-Final Office Action from U.S. Appl. No. 14/082,038, dated Sep. 17, 2015.
Notice of Allowance from U.S. Appl. No. 14/024,558, dated Aug. 25, 2015.

* cited by examiner

*Primary Examiner* — Antonio A Caschera
(74) *Attorney, Agent, or Firm* — Zilka-Kotab, PC

(57) ABSTRACT

A system, method, and computer program product enable compression with programmable sample locations, where the compression is a function of the programmable sample locations. The method includes the steps of storing a first value specifying a programmed sample location within a pixel in a sample pattern table and storing, in a memory, geometric surface parameters corresponding to a first attribute at the programmed sample location within a first pixel of a display surface. An instruction to store a second value specifying the programmed sample location within the pixel in the sample pattern table is received. The attribute is reconstructed based on the geometric surface parameters and the first value.

20 Claims, 13 Drawing Sheets

(1xAA)

(2xAA)

(4xAA)

(8xAA)

(8xAA)

| Display Surface 725 | | | | | |
|---|---|---|---|---|---|
| Tile Sample Pattern 750(0) | Surface Parameters 770(0) | Tile 715(0) | Tile Sample Pattern 750(1) | Surface Parameters 770(1) | Tile 715(1) |
| Tile Sample Pattern 750(2) | Surface Parameters 770(2) | Tile 715(2) | Tile Sample Pattern 750(3) | Surface Parameters 770(3) | Tile 715(3) |
| . . . | | | | | |
| Tile Sample Pattern 750(N-1) | Surface Parameters 770(N-1) | Tile 715(N-1) | Tile Sample Pattern 750(N) | Surface Parameters 770(N) | Tile 715(N) |

*Fig. 7D* ically, many implementations of SSAA or MSAA in graphics processors utilize a fixed set of sample locations stored in static random access memory (SRAM), which limits the different anti-aliasing algorithms that can be implemented by software. Some algorithms for implementing anti-aliasing may benefit from varying sample patterns across the pixels of a digital image, which is not possible with fixed sample locations specified by the hardware architecture.

SYSTEM, METHOD, AND COMPUTER PROGRAM PRODUCT FOR USING COMPRESSION WITH PROGRAMMABLE SAMPLE LOCATIONS

FIELD OF THE INVENTION

The present invention relates to graphics processing, and more particularly to accessing surfaces that are compressed based on sample locations.

BACKGROUND

Anti-aliasing techniques are well-known in the art of computer-generated graphics. Aliasing refers to image artifacts caused by a limited sampling resolution of edges. One common artifact produced as a result of aliasing is a Moire pattern, which is a type of spatial aliasing that causes alternating bands of light and dark colors to appear when, e.g., two grids are overlaid at an angle.

There are many common techniques to reduce the artifacts caused by aliasing. For example, supersample anti-aliasing (SSAA) is a technique that selects multiple points within each pixel (not just the pixel center), shades each of the multiple points to generate multiple color values for the pixel, and then blends the multiple color values to generate a filtered color value for the pixel. It will be appreciated that SSAA increases the resolution of the generated digital image and then down-samples the digital image (i.e., filters) to get a digital image at the desired resolution. The artifacts due to aliasing in the down-sampled digital image are reduced when compared to an image generated at the final resolution. However, SSAA has drawbacks in that each point sampled within a pixel increases the computation required to generate the digital image (e.g., 4×SSAA requires approximately 4 times the number of texture operations compared to techniques which compute a single color for the pixel).

Another anti-aliasing technique is multi-sample anti-aliasing (MSAA), which is a special case of SSAA. In MSAA, the graphics processing pipeline implements certain operations using multiple sample points within each pixel; however, the fragment shading program is only computed once per pixel and is typically evaluated based on a sample location at the center of the pixel. MSAA typically involves a smaller number of computations when compared to SSAA because, e.g., texture reads are only performed for a single point for each pixel.

Modern graphics processors typically implement at least one technique to reduce aliasing artifacts. However, implementation of anti-aliasing techniques may reduce the processing efficiency of the graphics processing pipeline. Furthermore, many implementations of SSAA or MSAA in graphics processors utilize a fixed set of sample locations stored in static random access memory (SRAM), which limits the different anti-aliasing algorithms that can be implemented by software. Some algorithms for implementing anti-aliasing may benefit from varying sample patterns across the pixels of a digital image, which is not possible with fixed sample locations specified by the hardware architecture.

However, when sample patterns can be changed, data that is stored in a compressed format may not be correctly reconstructed. For example, when a first sample pattern is used to compress data, the data cannot necessarily be correctly reconstructed using a second sample pattern. Thus, there is a need for addressing this issue and/or other issues associated with the prior art.

SUMMARY

A system, method, and computer program product are provided for using compression with programmable sample locations. The method includes the steps of storing a first value specifying a programmed sample location within a pixel in a sample pattern table and storing, in a memory, geometric surface parameters corresponding to a first attribute at the programmed sample location within a first pixel of a display surface. An instruction to store a second value specifying the programmed sample location within the pixel in the sample pattern table is received. The first attribute is reconstructed based on the geometric surface parameters and the first value.

BRIEF DESCRIPTION OF THE DRAWINGS

FIG. 7D illustrates a display surface that stores a sample pattern table, in accordance with one embodiment;

DETAILED DESCRIPTION

Figure 1:
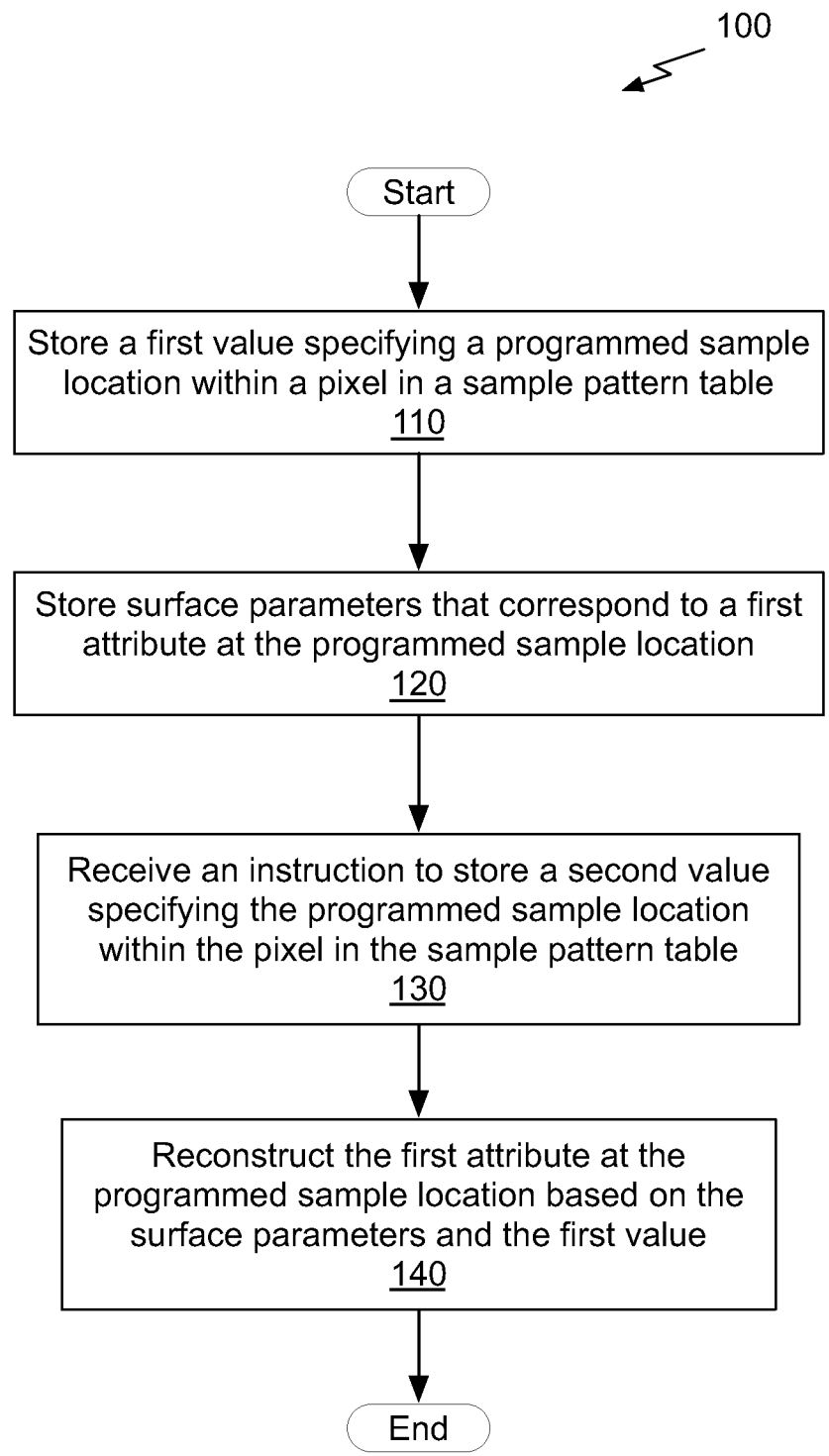
FIG. 1 illustrates a flowchart of a method for using compression with programmable sample locations, in accordance with one embodiment.

Existing graphics hardware typically implements fixed sample patterns stored in SRAM that are utilized by various anti-aliasing algorithms implemented on the graphics hardware. However, for some classes of anti-aliasing algorithms, varying the sample pattern across pixels may be desired to produce better results. For example, support for jittered sample patterns may produce less regular "roping" aliasing artifacts. Jittering generates a more random noise within the digital image that is less disturbing to a viewer. Some graphics hardware includes a programmable table that stores locations of samples so that a programmer can specify the sample patterns for the different pixels in a digital image using various commands implemented by an Application Programming Interface (API).

Typically, the sample patterns may be reprogrammed and a single table may be accessed to generate graphics data for different display surfaces. In the context of the following description, a display surface is a render target or portion of memory configured to store graphics data associated with pixels (e.g., a frame buffer, Z-buffer, color buffer). When the graphics data is stored in a sample-specific compressed format, the sample locations are needed not only during rasterization, but are also needed later, to decompress the graphics data and perform shading and/or z-buffering operations. In the context of the following description, a sample-specific compressed format represents graphics data that is compressed and decompressed as a function of sample locations. When a second set of sample locations overwrites a first set of sample locations after graphics data generated using the first set of sample locations is compressed, the graphics data cannot necessarily be correctly reconstructed. In other words, when the graphics data that was generated and compressed using the first set of sample locations is decompressed using the second set of sample locations, the graphics data is not necessarily correctly reconstructed. Incorrect reconstruction of the graphics data can produce visual artifacts that are undesirable.

In one embodiment, a processor implements one or more programmable sample pattern tables so that different versions of the sample locations can be programmed and accessed when graphics data is reconstructed from a sample-specific compressed format. However, implementing multiple sample pattern tables is expensive in terms of the additional circuitry that is needed. In some embodiments, before a sample pattern table is overwritten, the sample-specific compressed graphics data that was generated using the sample pattern table is decompressed and the reconstructed graphics data is stored. Examples of various sub-units of the processor that may store at least portions of a programmable sample pattern table are described in more detail below. Examples of accessing sample-specific-compressed display surfaces and reconstructing attributes that are sample-specific-compressed are also described.

FIG. 1 illustrates a flowchart of a method 100 for using sample-specific compression with programmable sample locations, in accordance with one embodiment. At step 110, a first value specifying a programmed sample location within a pixel is stored in a programmable sample pattern table. In the context of the present description, the programmable sample pattern table is a memory or set of registers storing one or more values that represent relative sample locations within one or more pixels. In one embodiment, the programmable sample pattern table is included in a hardware unit that, in response to receiving an instruction, copies one or more values from a local memory (e.g., a synchronous dynamic random access memory or SDRAM) into the programmable sample pattern table. In another embodiment, the one or more values are included in the instruction. For example, an instruction may include an index for a slot of the programmable sample pattern table and a value to store in the programmable sample pattern table at the slot specified by the index. In yet another embodiment, the instruction could cause the hardware unit to generate the values for the programmable sample pattern table, such as by generating random values to fill in the table.

At step 120, geometric surface parameters corresponding to a first attribute at the programmed sample location within a first pixel of a surface are stored in a memory. In the context of the present description, the geometric surface parameters represent graphics data, such as attributes in a compressed format. The first attribute may be one or more of color, depth, texture coordinates, and the like. A surface equation corresponding to a graphics primitive such as a triangle or high-order surface may be evaluated at the programmed sample location to generate the first attribute. The surface equation may also be evaluated at other programmed sample locations to generate additional attributes for the first pixel and for other pixels of a display surface.

At step 130, an instruction to store a second value specifying the programmed sample location within the pixel in the programmable sample pattern table is received. At step 140, the attribute is reconstructed based on the geometric surface parameters read from the memory and the first value read from the programmable sample pattern table. The reconstruction is performed before the first value in the programmable sample pattern table is overwritten by the second value.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
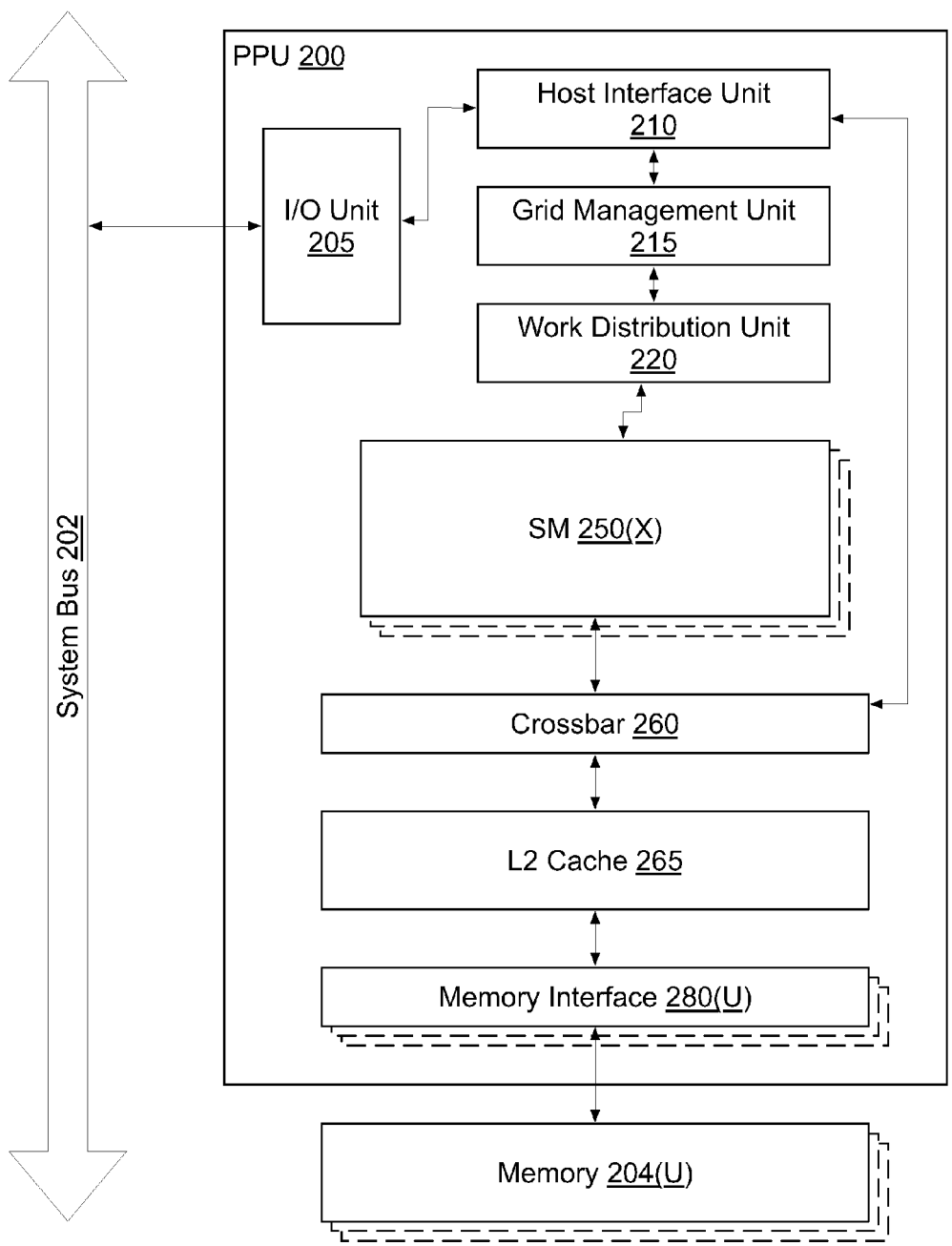
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the grid management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the grid management unit (GMU) 215 with pointers to one or more streams. The GMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the GMU 215 and the SMs 250 manages a pool of active grids, selecting and dispatching active grids for execution by the SMs 250. Pending grids are transferred to the active grid pool by the GMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the GMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250 (X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. Attributes may include one of more of position, color, surface normal vector, texture coordinates, etc. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 215 may configure one or more SMs 250 to execute a vertex shader program that processes a number of vertices defined by the model data. In one embodiment, the GMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
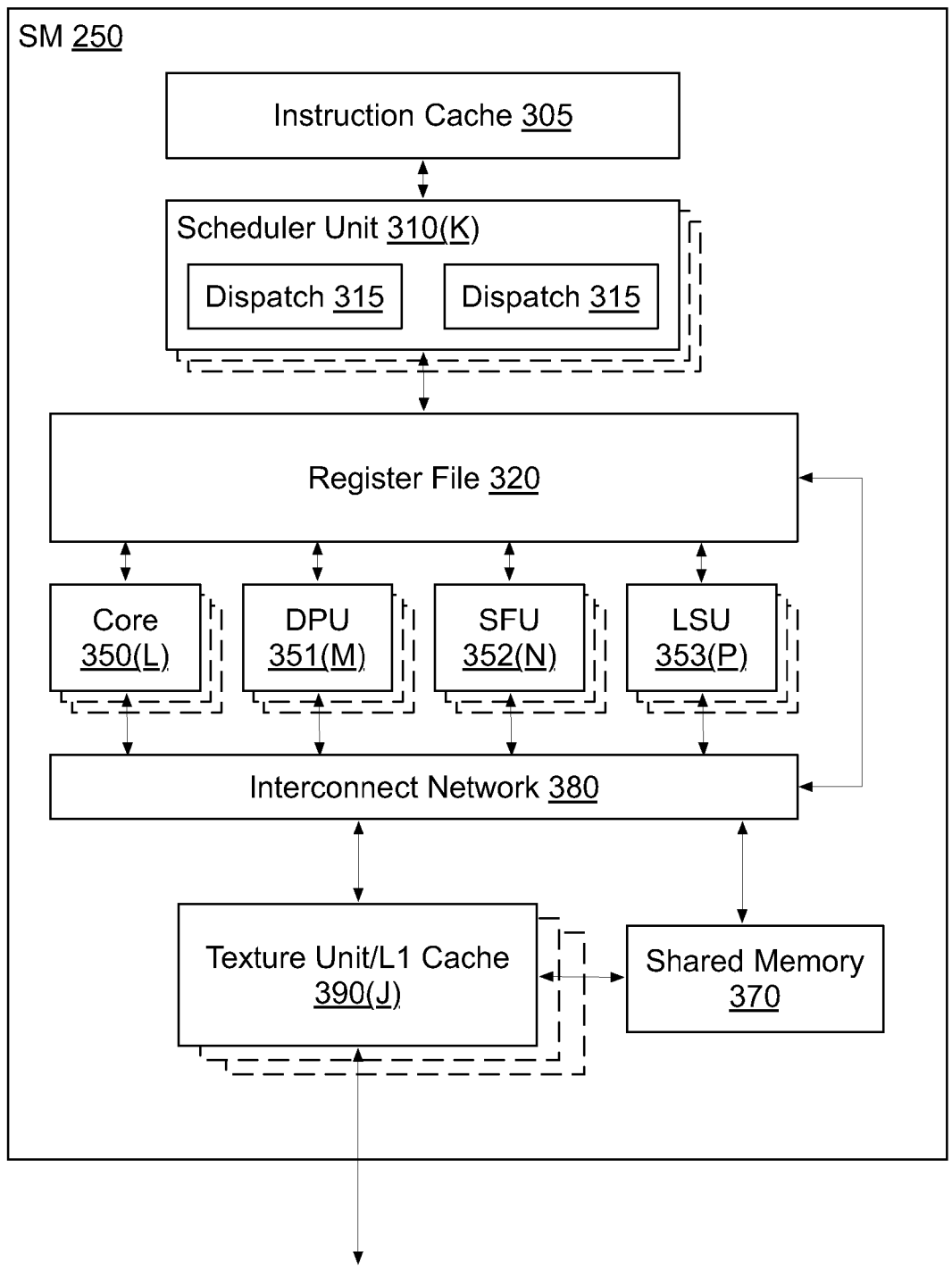
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. As described further herein, the texture unit/L1 caches 390 are also configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

Figure 4:
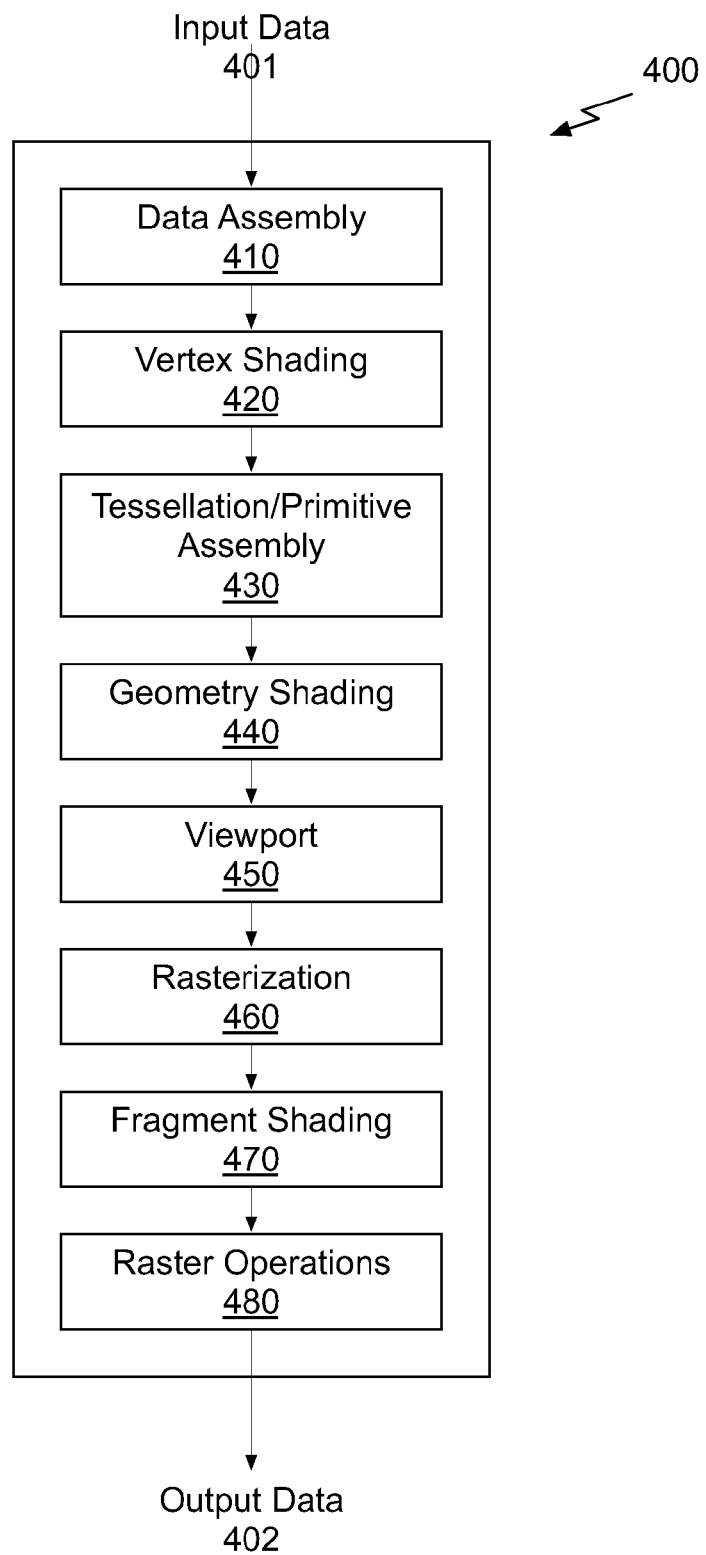
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API or by DirectX 11® by MICROSOFT.

As shown in FIG. 4, the graphics processing pipeline 400 comprises a pipeline architecture that includes a number of stages. The stages include, but are not limited to, a data assembly stage 410, a vertex shading stage 420, a tessellation/primitive assembly stage 430, a geometry shading stage 440, a viewport transform stage 450, a rasterization stage 460, a fragment shading stage 470, and a raster operations stage 480. In one embodiment, the input data 401 comprises commands that configure the processing units to implement the stages of the graphics processing pipeline 400 and process high-order geometric primitives (e.g., patches) and simpler geometric primitives (e.g., points, lines, triangles, quads, triangle strips or fans, etc.) to be processed by the stages. The output data 402 may comprise pixel data (i.e., color data) that is copied into a frame buffer or other type of surface data structure in a memory. The SMs 250 may be configured by shader program instructions to function as one or more shading stages (e.g., vertex, hull, domain, geometry, and pixel shading stages).

The data assembly stage 410 receives the input data 401 that specifies vertex data for high-order geometry. The data assembly stage 410 collects the vertex data defining the high-order graphics geometry in a temporary storage or queue, such as by receiving a command from the host processor that includes a pointer to a buffer in memory and reading the vertex data from the buffer. In one embodiment, a memory system may include one or more of the memory 204, the L2 cache 265, and the texture unit/L1 cache 390. The vertex data is then transmitted to the vertex shading stage 420 for processing.

The vertex shading stage 420 processes vertex data by performing a set of operations (i.e., a vertex shader or a program) once for each of the vertices. Vertices may be, e.g., specified as a 4-coordinate vector associated with one or more vertex attributes. The vertex shading stage 420 may manipulate properties such as position, color, texture coordinates, and the like. In other words, the vertex shading stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 420 generates transformed vertex data that is transmitted to the tessellation/primitive assembly stage 430.

The tessellation/primitive assembly stage 430 collects vertices output by the vertex shading stage 420 and tessellates patches represented by the vertices and control points into geometric primitives. In one embodiment, the tessellation/primitive assembly stage 430 groups the vertices into geometric primitives for processing by the geometry shading stage 440. For example, the tessellation/primitive assembly stage 430 may be configured to group every three consecutive vertices as a geometric primitive (i.e., a triangle) for transmission to the geometry shading stage 440. In some embodiments, specific vertices may be reused for consecutive geometric primitives (e.g., two consecutive triangles in a triangle strip may share two vertices). The primitive assembly stage 430 transmits geometric primitives (i.e., a collection of associated vertices) to the geometry shading stage 440.

The geometry shading stage 440 processes geometric primitives by performing a set of operations (i.e., a geometry shader or program) on the geometric primitives. Geometry shading operations may generate one or more geometric primitives from each geometric primitive. In other words, the geometry shading stage 440 may subdivide each geometric primitive into a finer mesh of two or more geometric primitives for processing by the rest of the graphics processing pipeline 400. The geometry shading stage 440 transmits geometric primitives to the viewport stage 450.

The viewport stage 450 performs a viewport transform, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization stage 460.

The rasterization stage 460 converts the 3D geometric primitives into 2D fragments. The rasterization stage 460 may be configured to utilize the vertices of the geometric primitives to setup a set of surface equations from which various attributes can be interpolated. In one embodiment, the surface equations are plane equations in the form $Ax+By+C$, where x and y are sample locations and A, B, and C are plane equation parameters. In other embodiments, a surface equation specifies a high-order surface such as a patch. The rasterization stage 460 may also compute a coverage mask for a plurality of pixels that indicates whether one or more sample locations for the pixel intersect the geometric primitive. The rasterization stage 460 generates fragment data (i.e., interpolated vertex attributes associated with a particular sample location for each covered pixel) that are transmitted to the fragment shading stage 470.

The fragment shading stage 470 processes fragment data by performing a set of operations (i.e., a fragment shader or a program) on each of the fragments. The fragment shading stage 470 may generate pixel data (i.e., color values) for the fragment such as by performing lighting operations or sampling texture maps using interpolated texture coordinates for the fragment. The fragment shading stage 470 generates pixel data that is transmitted to the raster operations stage 480.

The raster operations stage 480 may perform various operations on the pixel data such as performing alpha tests, Z-test, stencil tests, and blending the pixel data with other pixel data corresponding to other fragments associated with the pixel. When the raster operations stage 480 has finished processing the pixel data (i.e., the output data 402), the pixel data may be written to a display surface (i.e., render target such as a frame buffer, a color buffer, Z-buffer, or the like).

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 440). Other types of graphics processing pipelines are contemplated as being within the scope of the present disclosure. Furthermore, any of the stages of the graphics processing pipeline 400 may be implemented by one or more dedicated hardware units within a graphics processor such as PPU 200. Other stages of the graphics processing pipeline 400 may be implemented by programmable hardware units such as the SM 250 of the PPU 200.

Figure 5:
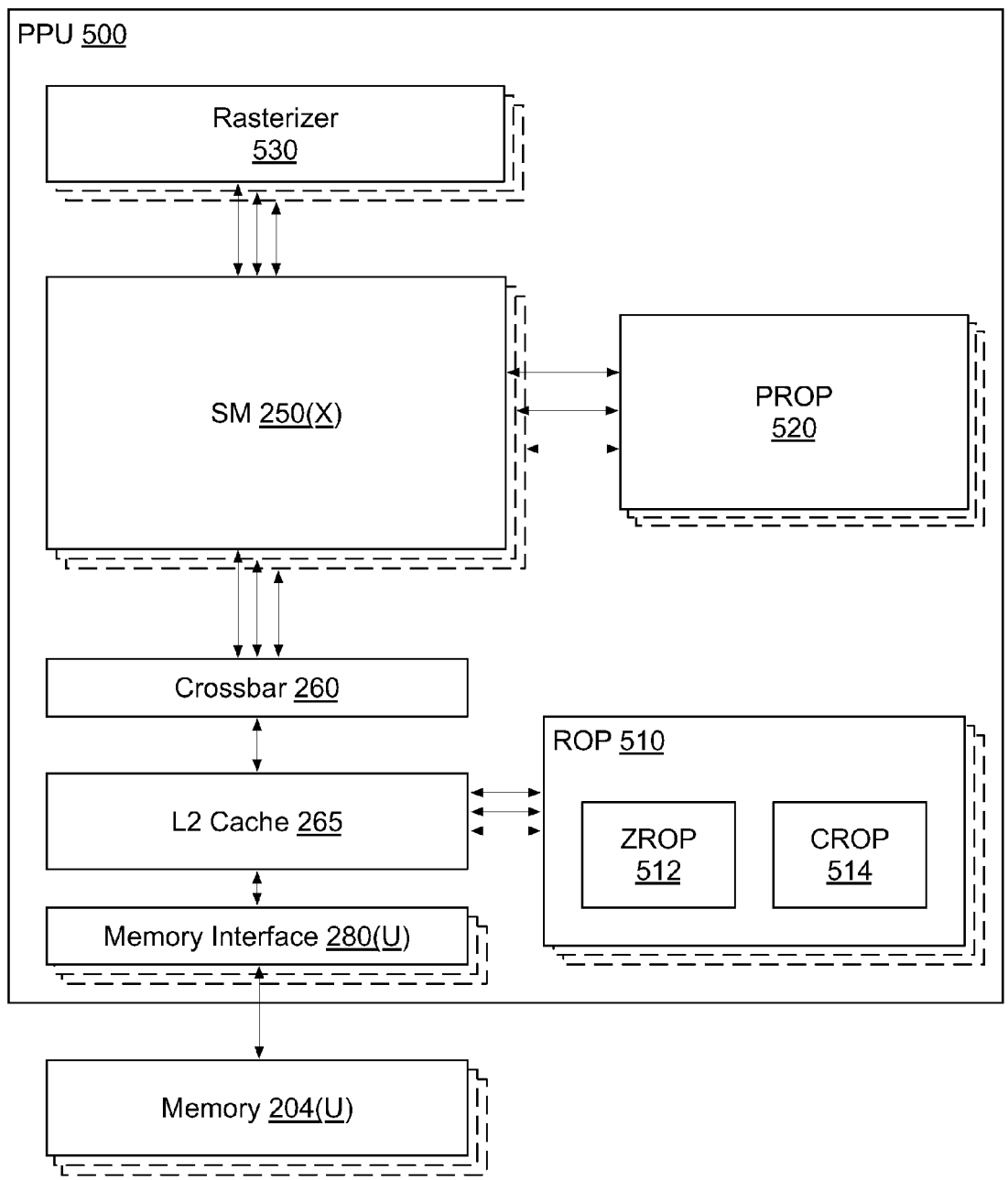
FIG. 5 illustrates a PPU that is configured to implement the graphics processing pipeline, in accordance with another embodiment.

FIG. 5 illustrates a PPU 500 that is configured to implement the graphics processing pipeline 400, in accordance with another embodiment. The PPU 500 is similar to PPU 200 of FIG. 2. The PPU 500 may include one or more dedicated hardware units for implementing various stages of the graphics processing pipeline 400 while other stages of the graphics processing pipeline 400 may be implemented within the programmable SMs 250. As shown in FIG. 5, the PPU 500 includes one or more raster operations units 510, one or more pre-raster operations (PROP) units 520, and one or more rasterizers 530. Each of these dedicated hardware units may be configured to implement at least a portion of the operations for a stage of the graphics processing pipeline 400, described above.

In one embodiment, the raster operations (ROP) units 510 include a z-raster operations (ZROP) engine 512 and a color-raster operations (CROP) engine 514. The ZROP engine 512 compares Z-values for pixel data to previously stored Z-values read for the corresponding sample locations, where the previously stored Z-values are read from a surface stored in the memory 204. The results from the ZROP engine 512 determine if the various pixel data for a fragment will be kept or discarded. More specifically, the ZROP engine 512 compares the Z-value of each sample location with the Z-value of a corresponding sample location stored in a depth map (i.e., Z-buffer surface). This process is known as Z-testing. If the current fragment passes Z-testing, then the ZROP engine 512 optionally writes the Z-value for the current fragment to the corresponding sample location in the depth map. If the current fragment does not pass Z-testing, then the pixel data may be discarded and the Z-value for the current fragment is not written to the depth map. The CROP engine 514 writes the color value for the current fragment to the frame buffer if the fragment passes the Z-testing.

The z-value attributes and color attributes may be stored in a sample-specific-compressed format, such as a plane-compressed format. Rather than storing an attribute value at each sample location, the plane equation coefficients are stored as surface parameters and a plane equation may be evaluated at a sample location using the plane equation coefficients for the attribute to reconstruct the attribute at the sample location. In another embodiment, the surface parameters correspond to a high-order surface and an equation specifying the high-order surface is evaluated at a sample location using the surface parameters for the attribute to reconstruct the attribute at the sample location.

In one embodiment, the number of ROP units 510 may be equal to the number of memory partitions 204, with each ROP unit 510 allocated to a particular memory partition 204. The ZROP unit 512 or the CROP unit 514 reads or writes values to the L2 cache 265. Then, the L2 cache 265 manages memory fetch requests from the memory 204 or the write-back of dirty data from the L2 cache 265 into the memory 204. Although not explicitly shown, the ROP units 510 may be coupled to the L2 Cache 265 as well as the SM 250 and the PROP units 520 via the crossbar 260.

The PROP units 520 manage the flow of pixel data between the ZROP engine 512, the CROP engine 514, and the SM 250. In one embodiment, the number of PROP units 520 matches the number of SMs 250, with each PROP unit 520 allocated to a particular SM 250. It will be appreciated that the number of PROP units 520 is not necessarily the same as the number of ROP units 510. Again, although not explicitly shown, the PROP units 520 may communicate with the ROP units 510 via the crossbar 260.

In addition to the ROP units 510 and the PROP units 520, the PPU 500 includes one or more rasterizers 530 coupled to the one or more SMs 250. In one embodiment, the number of rasterizers 530 equals the number of SMs 250. Each rasterizer 530 is a dedicated hardware unit configured to perform at least a portion of the operations of the rasterization stage 460 of the graphics processing pipeline 400, described above. For example, the rasterizer 530 may receive a geometric primitive from the viewport stage 450 and set up surface equations corresponding to the geometric primitive. Although not explicitly shown, the rasterizers 530 may be coupled to the crossbar 260 in order to communicate with other units of the PPU 500 such as the SMs 250 or a hardware unit configured to implement at least a portion of the operations of the viewport stage 450 of the graphics processing pipeline 400.

It will be appreciated that the rasterizers 530 implement anti-aliasing operations. For example, in order to calculate a coverage mask for a tile of pixels, the rasterizer 530 performs intersection tests that determine whether each sample location in the tile of pixels is intersected by a geometric primitive. A pixel tile may be an array of pixels in a digital image such as a 16×16 array of pixels, which would include, e.g., 16 pixel quads. The intersection tests indicate whether the sample locations are covered by the geometric primitive. The coverage information is passed down the graphics processing pipeline to the fragment shading stage 470. If anti-aliasing techniques are implemented, then the intersection tests should be computed for each of the two or more sample locations within a pixel. Therefore, the rasterizer 530 includes a programmable sample pattern table for determining where each of the sample locations are within a particular pixel. Additional units within the PPU 500 also implement anti-aliasing operations including the ZROP engine 512 and any SM 250 configured to execute a fragment shader. In one embodiment, the rasterizer 530 includes multiple sample pattern tables and each display surface stored in memory is associated with one of the multiple sample pattern tables.

Figure 6A:
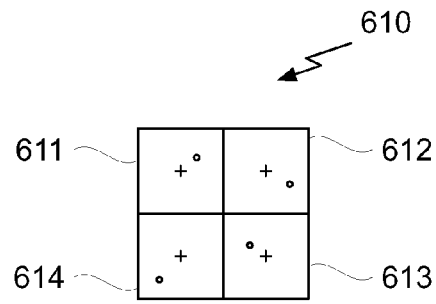
FIGS. 6A through 6E illustrate various anti-aliasing sample patterns, in accordance with one embodiment.

FIGS. 6A through 6E illustrate various anti-aliasing sample patterns, in accordance with one embodiment. As shown in FIG. 6A, a 1× anti-aliasing (1×AA) sample pattern may be defined for a pixel quad 610. The pixel quad 610 is a 2×2 array of pixels (611, 612, 613, and 614). In one embodiment, the sample pattern for the pixel quad 610 comprises each of the pixel centers (shown as cross-hairs in FIG. 6A). In other words, when the PPU 500 is configured to generate pixel data using 1×AA, a single sample location for each pixel corresponds to the pixel center. However, because the sample pattern is a regularly spaced array with one sample point per pixel, an image generated using 1×AA may exhibit aliasing artifacts. In another embodiment, the sample pattern for the pixel quad 610 may be jittered (i.e., randomly distributed throughout the pixels) in order to alleviate the aliasing artifacts. As shown in FIG. 6A, the jittered sample locations for each pixel may be shown by the small circles offset from each pixel's center. By moving the sampling locations so that the sampling locations are not located at the pixel centers, the resulting pixel data includes some amount of random noise, which alleviates the aliasing artifacts by some small amount.

Figure 6B:
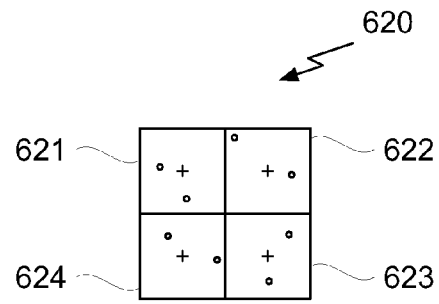
Figure 6C:
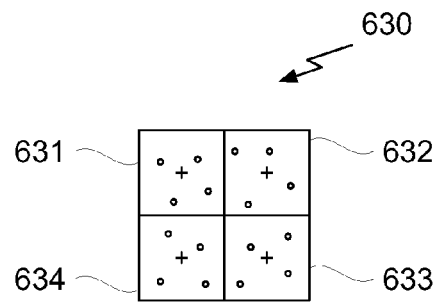

While jittering the sample locations alleviates the aliasing artifacts, rendering the image at a higher resolution and then down-sampling the high-resolution image to generate the resulting image data helps reduce aliasing artifacts even more. As shown in FIG. 6B, each pixel (621, 622, 623, and 624) in the pixel quad 620 includes two sample locations. Two sample locations per pixel corresponds to 2× anti-aliasing (2×AA). Again, the sample locations in the sample pattern for the pixel quad 620 may be distributed within the pixels. As shown in FIG. 6C, a pixel quad 630 may include pixels (631, 632, 633, and 634) that include four sample locations corresponding to 4× anti-aliasing (4×AA). A sample pattern defining sample locations that are distributed within less than four pixels or more than four pixels is contemplated as being within the scope of the present disclosure.

Figure 6D:
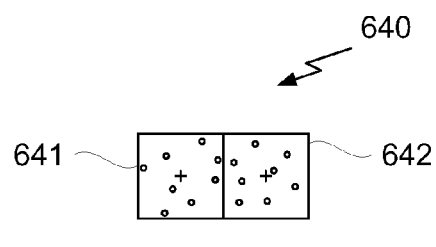
Figure 6E:
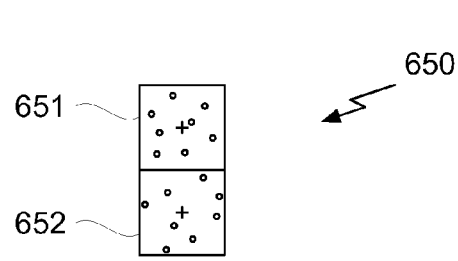

Some graphics hardware may be limited in the number of sample locations that are stored in hardware units. For example, some hardware units may have a limit of 16 sample locations per pixel quad. While this limitation enables 4×AA for a pixel quad, 8× anti-aliasing (8×AA) cannot be performed for a pixel quad because this configuration may require 32 sample locations. In such cases, two pixels can be processed substantially simultaneously in either a 1×2 array of pixels (FIG. 6D) or a 2×1 array of pixels (FIG. 6E). As shown in FIG. 6D, each pixel (641 and 642) in the pixel pair 640 includes eight sample locations. Similarly, as shown in FIG. 6E, each pixel (651 and 652) in the pixel pair 650 includes eight sample locations. Furthermore, with such limitations, each pixel pair 650 will have the same sample locations when implementing 16×AA. Reducing the size of the pixel array to 1×2, 2×1, or 1×1 will limit or eliminate jittering.

In one embodiment, each slot of a programmable sample pattern table stores an 8-bit value that indicates an offset from the upper left corner of a pixel using two 4-bit values, where a first portion (i.e., the four most significant bits) of the 8-bit value indicates a horizontal offset from the upper left corner of the pixel and a second portion (i.e., the four least significant bits) of the 8-bit value indicates a vertical offset from the upper left corner of the pixel. In other words, each value stored in a slot of the programmable sample pattern tables indicates one of 16×16=256 possible sample locations within a pixel relative to the upper left corner of the corresponding pixel. The upper left corner of the pixel may be referred to herein as the origin for the pixel. In other embodiments, other points relative to the center of the pixel may be chosen as the origin from which the values in the programmable sample pattern table define a relative position from. In yet other embodiments, each slot of the programmable sample pattern table may store a number of bits less than or more than 8-bits. For example, each slot of the programmable sample pattern table may store 64 bits, holding two 32-bit single-precision floating point values that range between 0.0 and 1.0 that indicate a relative position within the pixel (where the lower right corner of the pixel corresponds to an entry of <1.0, 1.0>).

In one embodiment, the programmable sample pattern table includes sixteen entries. It will be appreciated that sixteen entries is the maximum entries for any of the example anti-aliasing algorithms illustrated in FIGS. 6A-6E. In one embodiment, the PPU 550 has an architecture that executes sixteen threads in parallel simultaneously, thereby calculating values for each of the samples in a pixel quad (or a pixel pair in the case of 8×AA) in parallel. Thus, a sixteen entry programmable sample pattern table is large enough to handle every sample executed in parallel, and can be reprogrammed for subsequent pixel quads if necessary. However, there is no inherent reason to limit the number of entries of the programmable sample pattern table to sixteen entries for other architectures, and a different number of entries, less than or greater than sixteen is contemplated as being within the scope of the present disclosure.

It will be appreciated that the programmable sample pattern table may include more entries than sample locations that are specified for a particular anti-aliasing algorithm. For example, a 1×AA algorithm requires only four sample locations per pixel quad. In one embodiment, a first four entries may be filled with valid sample location data and the other twelve entries of the programmable sample pattern table may contain invalid data. Similarly, for a 2×AA algorithm that requires eight sample locations per pixel quad, the first eight entries may be filled with valid sample location data and the other eight entries of the programmable sample pattern table may contain invalid data.

In another embodiment, a first instruction may configure the programmable sample pattern table such that each entry of the table contains valid sample location data. However, when a 1×AA or a 2×AA algorithm is enabled, multiple sets of sample locations may be stored in the programmable sample pattern table simultaneously and each pixel quad may specify which of the patterns in the programmable sample pattern table should be used for that particular pixel quad. For example, in conjunction with a 1×AA algorithm, the first four entries may be filled with valid sample location for a first set of sample locations, the second four entries may be filled with valid sample location for a second set of sample locations, and so forth. Pixel quads may then be configured to use one of the four valid sets of sample locations stored in the programmable sample pattern table. In one embodiment, the x-coordinate and y-coordinate of at least one pixel in the pixel quad may be used, at least in part, to select which of the sets of sample locations should be associated with the pixel quad. For example, a function based on the x-coordinate and y-coordinate of the upper left pixel in the pixel quad could be used to calculate which of the four sets of sample locations are associated with that particular pixel quad (e.g., $f(x,y)=(x+y) \% 4$).

Figure 7A:
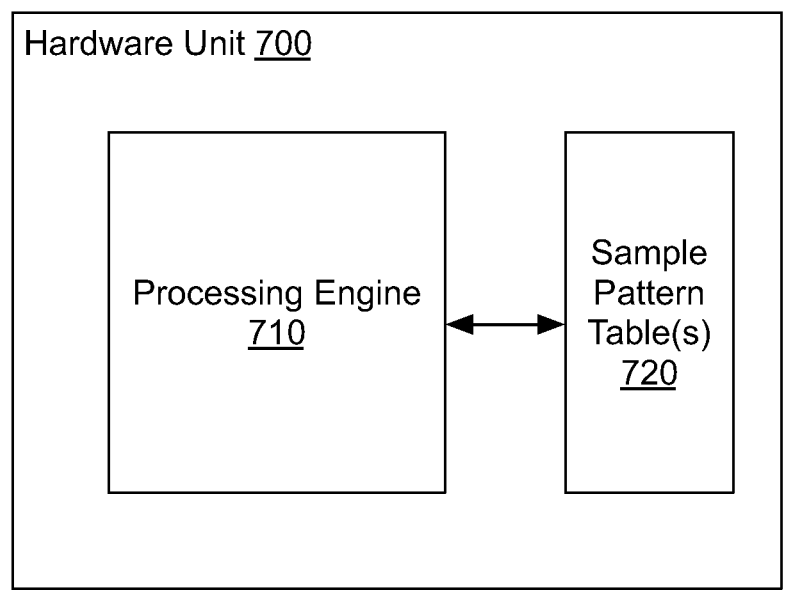
FIG. 7A illustrates a hardware unit that stores a programmable sample pattern table, in accordance with one embodiment.

FIG. 7A illustrates a hardware unit 700 configured to utilize a sample pattern for performing a calculation, in accordance with one embodiment. The hardware unit 700 may be, for example, the ROP units 510, the PROP units 520, the rasterizers 530, an SM 250, or any other unit that utilizes sample patterns for performing some type of calculation. As shown in FIG. 7A, the hardware unit 700 includes a processing engine 710 and one or more sample pattern table(s) 720. The processing engine 710 may be logic or circuitry configured to perform an operation that depends, at least partially, on a sample location within a pixel. For example, the processing engine 710 may include logic for calculating per-sample attributes, such as Z-values for a sample location of a pixel that is covered by a geometric primitive. In another example, the processing engine 710 may include logic for generating an attribute value using coordinates associated with a sample location. In still another example, the processing engine 710 may include logic for generating a shaded color value associated with a sample location. For example, texture coordinates interpolated based on the sample location may be used to perform a texture operation that samples a texture map to generate a filtered color value for the sample. The processing engine 710 may be configured to store the per-sample attributes using sample-specific-compression by storing surface parameters and sample coverage information. The attributes do not need to be stored because the attributes for covered samples can be reconstructed using the surface parameters and sample locations.

In one embodiment, the sample pattern table(s) 720 store the sample locations for a sample pattern associated with an anti-aliasing algorithm. For example, a sample pattern table for the 1×AA algorithm shown in FIG. 6A may include four entries corresponding to each of the sample locations for the pixel quad 610. Each entry in the sample pattern table may specify an offset from an origin of a corresponding pixel. For example, if the offset is the center of the pixel, each entry may include two signed integers that represent a horizontal and a vertical displacement of the sample location from the center of the pixel. In another example, if the offset is at a corner of the pixel, each entry may include two unsigned integers that represent a horizontal and a vertical displacement of the sample location from the corner of the pixel.

In operation, a host processor may generate instructions within a stream of instructions and data to be processed by the PPU 500 that, as the instructions are passed down the graphics processing pipeline 400 and received by the various hardware units 700 of the PPU 500, cause new values to be written into the programmable sample pattern table 720. The instruction may be ordered prior to data to be processed using sample locations that correspond to the new values. For example, a first instruction may configure the hardware unit 700 to process a first pixel quad according to a 4×AA algorithm using a first set of sample locations. Once the first pixel quad has been processed and prior to a second pixel quad being processed, a second instruction may re-configure the hardware unit 700 to process the second pixel quad according to the 4×AA algorithm using a second set of sample locations that is different than the first set of sample locations. Alternately, the second instruction could re-configure the hardware unit 700 to process the second pixel quad according to a different anti-aliasing algorithm entirely, such as a 2×AA algorithm.

It will be appreciated that, multiple sample pattern tables 720 may be used to specify different sample patterns for the same anti-aliasing algorithm. In one embodiment each display surface corresponds with a different one of the sample pattern tables 720. It will be appreciated that a different sample pattern table 720 must be included in each hardware unit 700 within the graphics processor in order to implement each distinct anti-aliasing algorithm that is enabled. In the case where the graphics processor includes many different hardware units 700 configured to implement different stages of the graphics processing pipeline, many instances of these sample pattern tables 720 will be implemented in the different hardware units 700. Implementing many instances of many different tables takes up valuable die overhead, increasing the size and complexity of the graphics processor integrated circuit. When sample-specific compression techniques are used to store the data associated with samples, the number of sample pattern tables 720 that are needed may increase because a display surface storing the attributes in a sample-specific-compressed format may be read by processing units other than those processing units that operate on the per-sample attributes. As described further herein, techniques may be used to reduce the number of instances of the sample pattern tables 720 that are implemented in a graphics processor when the attributes are stored using sample-specific-compression.

The linearly varying attributes corresponding to samples, such as depth, texture coordinates, color, and the like, may be stored in a sample-specific compressed format, using techniques such as plane compression. Rather than storing the attribute value for each sample, plane equation coefficients and coverage information is stored in a surface, such as a display surface. The attribute values may be reconstructed using the sample locations and the plane equation coefficients. As previously explained, different processing units within the PPU 500 that implement anti-aliasing operations need to access the sample locations stored in a programmable sample pattern table. When the attributes are stored using plane compression, a processing unit that reads the plane equation coefficients corresponding to the attributes also needs to access the sample locations that were used to generate the attributes (i.e., the original sample locations). For example, when a CPU may access a display surface represented in a plane compression format, the read access circuitry that provides the reconstructed attributes to the CPU needs to access the original sample locations stored in a programmable sample pattern table to generate the reconstructed attributes.

Figure 7B:
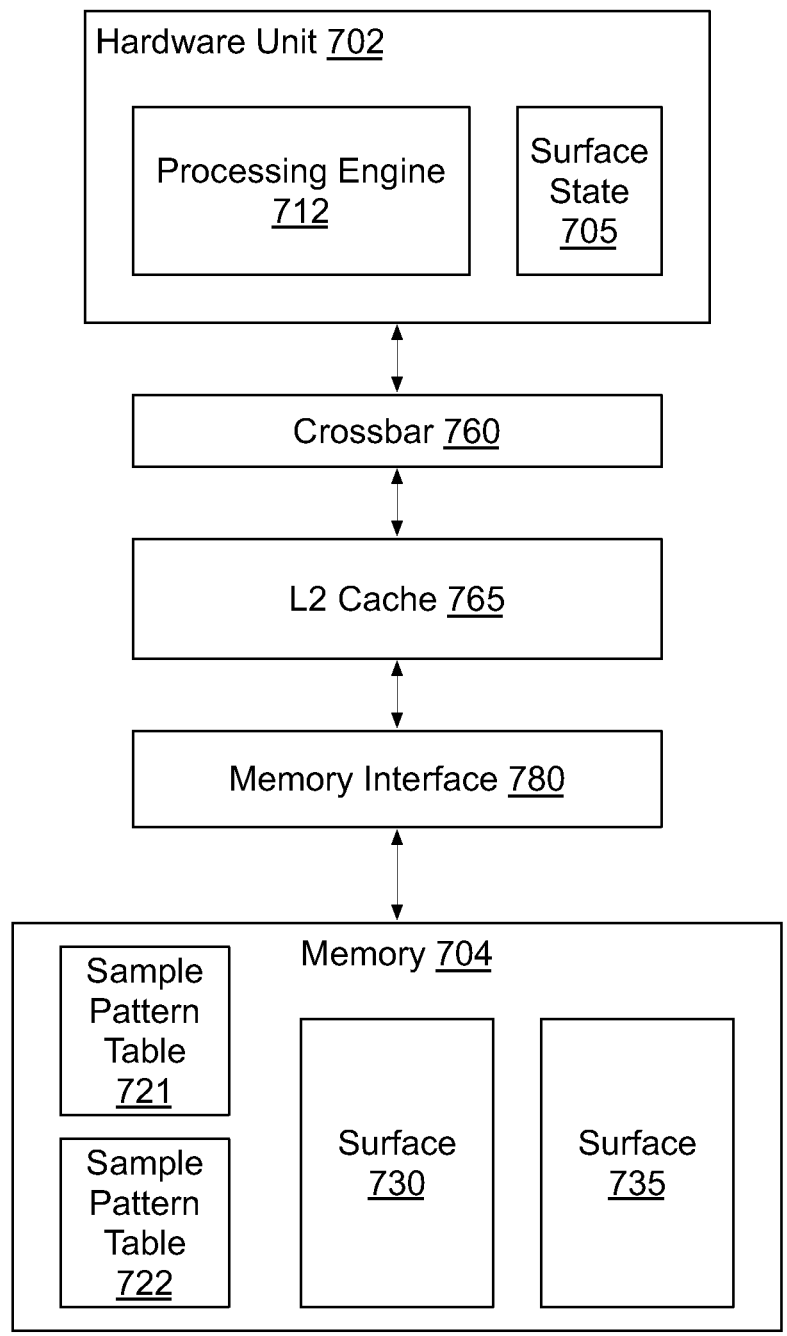
FIG. 7B illustrates a memory that stores one or more programmable sample pattern tables, in accordance with one embodiment.

FIG. 7B illustrates a memory 704 that stores one or more programmable sample pattern tables 721 and 722, in accordance with one embodiment. The hardware unit 702 may be, for example, the ROP units 510, the PROP units 520, the rasterizers 530, an SM 250, or any other unit that may access a display surface that stores per-sample attributes in a sample-specific-compressed format. The hardware unit 702 is indirectly coupled to the memory 704 via a crossbar 760, an L2 cache 765, and a memory interface 780. In one embodiment, the memory 704, a crossbar 760, an L2 cache 765, and a memory interface 780 are configured to function as the memory 204, the crossbar 260, the L2 cache 265, and the memory interface 280, respectively.

Each display surface may be associated with a different programmable sample pattern table 720. The memory 704 stores a first display surface 730 and a second display surface 735. Rather than storing multiple sample pattern tables 720 in the hardware unit 702, a surface state 705 stores a pointer to a first sample pattern table 721 that is associated with the first display surface 730 and a second pointer to a second sample pattern table 722 that is associated with the second display surface 735. The pointer may be an index that is stored in a texture header or a surface header in a register storing the surface state 705.

When an instruction is received by the hardware unit 702 to change a value specifying a programmed sample location, the value is written to the sample pattern table corresponding to a particular display surface. For example, a first value may be stored in the first sample pattern table 721 and a second value may be stored in the second sample pattern table 722, so that the first value is not overwritten and attributes stored in a sample-specific-compressed format in the first display surface 730 can be correctly reconstructed using the first value.

When the processing engine 712 in the hardware unit 702, receives a read request for an attribute stored in the display surface 730 or 735, the processing engine 712 first reads the surface state 705 to obtain the pointer to the sample pattern table that is associated with the display surface to be accessed. Then the hardware unit 702 reads the sample pattern table 721 and the display surface 730 or the sample pattern table 722 and the display surface 735. The processing engine 712 is configured to reconstruct the attribute that is stored in a sample-specific-compressed format using the sample pattern positions and surface parameters corresponding to the attribute. In another embodiment, one or more of the memory interface 780 and L2 cache 765 maybe configured to reconstruct the attribute or attributes that are read from the memory 704 in response to the read request. The reconstructed attribute is then returned to the processing engine 712. It should be noted that the combinations of display surfaces and sample pattern tables is set forth for illustrative purposes only, and different combinations may be possible. For example one sample pattern table may be used for two or more display surfaces or different portions of a display surface may be associated with different sample pattern tables.

Figure 7C:
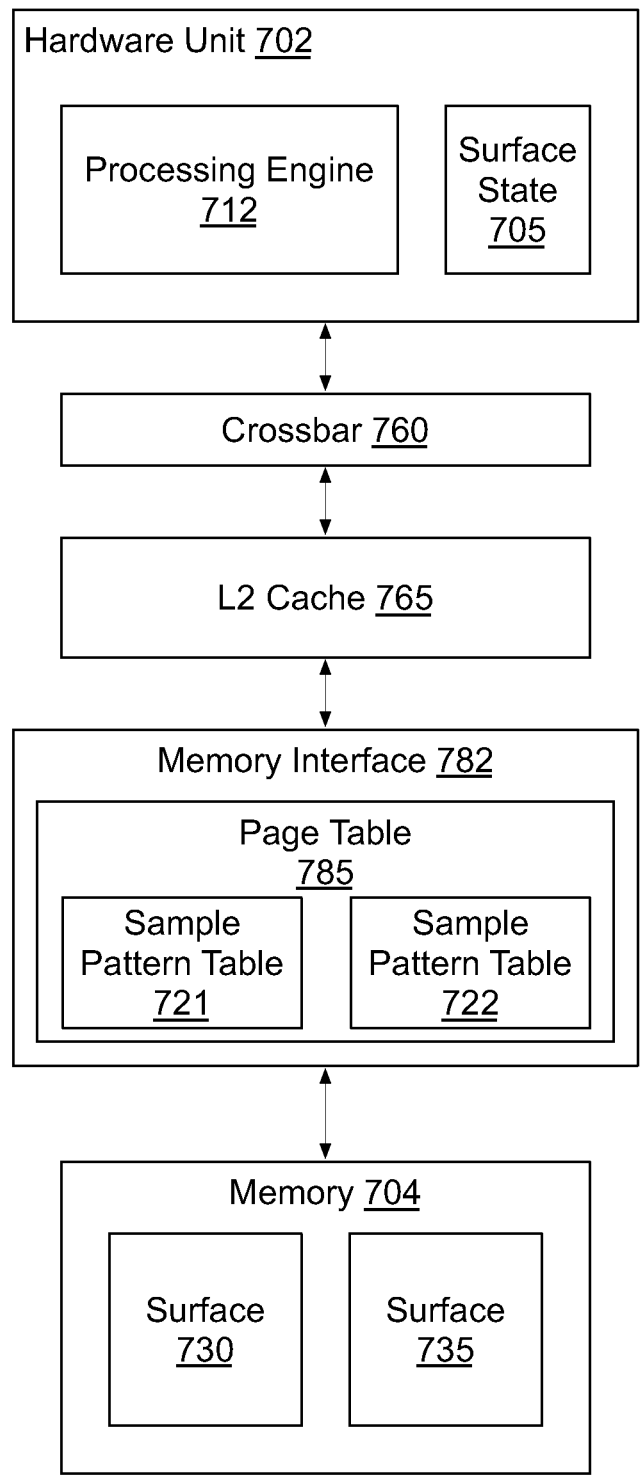
FIG. 7C illustrates a memory interface that stores one or more programmable sample pattern tables, in accordance with one embodiment.

FIG. 7C illustrates a memory interface 782 that stores one or more programmable sample pattern tables, in accordance with one embodiment. Compared with the memory interface 780 shown in FIG. 7B, the memory interface 782 stores the sample pattern tables 721 and 722 in a page table 785. In an alternate embodiment, pointers to the sample pattern tables 721 and 722 are stored in the page table 785 and the sample pattern tables 721 and 722 are stored in the memory 704. The surface state 705 does not necessarily store a pointer to a sample pattern table 721 or 722. Instead, the memory interface 782 determines the pointer based on an address specified by the read or write request.

When an instruction is received by the hardware unit 702 to change a value specifying a programmed sample location, the value is written to the sample pattern table for a particular display surface by the memory interface 782. Therefore, a first value stored in the first sample pattern table 721 is not overwritten when a second value is received and stored in the second sample pattern table 722, and attributes stored in a sample-specific-compressed format in the first display surface 730 can be correctly reconstructed using the first value.

When the processing engine 712 in the hardware unit 702, receives a read request for an attribute stored in the display surface 730 or 735, the processing engine 712 transmits the read request to the memory interface 782 through the crossbar 760 and the L2 cache 265. The memory interface 782 first reads the page table 785 to obtain the sample pattern table or a pointer to the sample pattern table that is associated with the display surface to be accessed. Then the memory interface 782 reads the sample pattern table 721 and the display surface 730 or the sample pattern table 722 and the display surface 735. The surface parameters corresponding to the attribute and sample locations are returned to the hardware unit 702. The processing engine 712 is configured to reconstruct the attribute that is stored in a sample-specific-compressed format using the sample pattern positions. In another embodiment, one or more of the memory interface 782 and L2 cache 765 may be configured to reconstruct the attribute or attributes using the surface parameters that are read from the memory 704 in response to the read request. The reconstructed attribute is then returned to the processing engine 712.

FIG. 7D illustrates a display surface 725 that stores a sample pattern table, in accordance with one embodiment. In one embodiment, the display surface 725 may be configured as a z-buffer or as a surface storing other attribute data. In contrast with the embodiments shown in FIGS. 7B and 7C, the sample pattern tables are stored in a portion of the memory 704 that is allocated to the display surface 725 with the surface parameters corresponding to an attribute. As shown, the tile sample pattern tables 750 are interleaved with the surface parameters for a pixel tile that are represented by surface parameters 770. The sample coverage information may be stored in the tiles 715.

In one embodiment a sample-specific-compressed pixel tile may include surface parameters 770 for four different surfaces covering 8×8 samples. The surface parameters 770 for two of the four surfaces may be replaced with the programmable sample locations, leaving the two remaining surfaces for representing the attributes for the pixel tile. An advantage of storing the programmable sample locations with the sample-specific-compressed attributes is that the sample locations are available along with the compressed attributes. Each display surface may specify sample locations that are unique to that display surface. Different sample locations may even be specified for each pixel tile within a single display surface, such as the display surface 725.

The storing the programmable sample pattern tables in the memory 704 or the memory interface 782 enables each processing engine 712 to access sample-specific-compressed attributes. An alternative technique may be used that does not require multiple versions of a programmable sample pattern table. In other words, a single sample pattern table may be used to reconstruct attributes for multiple display surfaces. When an instruction is received that will overwrite a value in the single sample pattern table and the value is still needed by one or more processing units that may access a display surface corresponding to the value, a decompress-in-place operation is performed for at least a portion of the display surface. A decompress-in-place operation is performed by a processing unit that is configured to access the sample pattern table and the display surface storing sample-specific-compressed attributes, reconstruct the attributes using the sample locations stored in the programmable sample pattern table, and write the reconstructed attributes back to the display surface. After a display surface is decompressed, the sample locations are no longer needed to reconstruct the attributes. Therefore, the attributes stored in a display surface may be read by any processing unit, even a processing unit that does not store or cannot otherwise access the programmable sample pattern table associated with the display surface.

Different processing units within a graphics processor such as the PPU 500 may have different performance requirements. For example, the ZROP units 512 should have high performance for read, write, and read-modify-write operations. In contrast, a processing unit that copies data from the memory 204 to system memory has less critical performance requirements. Rather than implementing support for reconstructing attributes with programmable sample patterns across all processing units in a graphics processor, processing units that have more critical performance requirements may include circuitry for reconstructing attributes for programmable sample patterns and other processing units having less critical performance requirements may not include the circuitry for reconstructing attributes for programmable sample patterns. In one embodiment, the processing units may include circuitry for supporting full speed accesses of sample-specific-compressed attributes for those sample patterns that are seen as most important. When a display surface is accessed for a sample pattern that is not stored, the display surface may be decompressed-in-place by another processing unit that stores the sample pattern associated with the display surface.

For example in one embodiment, the ZROP engine 512 includes one or more sample pattern tables 720 and circuitry for performing sample-specific compression of attributes and circuitry for reconstructing attributes. Therefore, the ZROP engine 512 can read and/or write attributes using the programmable sample patterns. The ZROP engine 512 may therefore, be configured to perform a decompress-in-place operation for a display surface. In contrast, the texture unit/L1 cache 390 in the SM 250 may not include a programmable sample pattern table 720 and/or the circuitry for performing sample-specific compression of attributes and circuitry for reconstruction of attributes. Instead, the texture unit/L1 cache 390 in the SM 250 may only support attribute reconstruction for a subset of sample patterns.

Selectively implementing full support for programmable sample locations and sample-specific compression of attributes and reconstruction of attributes is a hybrid approach that allows for full speed support for common sample patterns, as well as full speed support in critical processing engines (e.g., the ZROP engine 512) for reads/writes to sample-specific-compressed attributes stored in a display surface. The hybrid approach allows for a trade-off of reduced performance and simpler design for processing engines that do not need to run at full speed. However, a translation operation, such as a decompress-in-place operation may be needed for the processing engines that do not implement full support to reconstruct sample-specific-compressed attributes using programmable sample locations. A decompress-in-place operation may be implemented by a device driver or by the PPU 200 or an SM 250. A decompress-in-place operation may also be performed when a paging event occurs that copies the display surface from memory 204 to a system memory for access by another processor.

Figure 8:
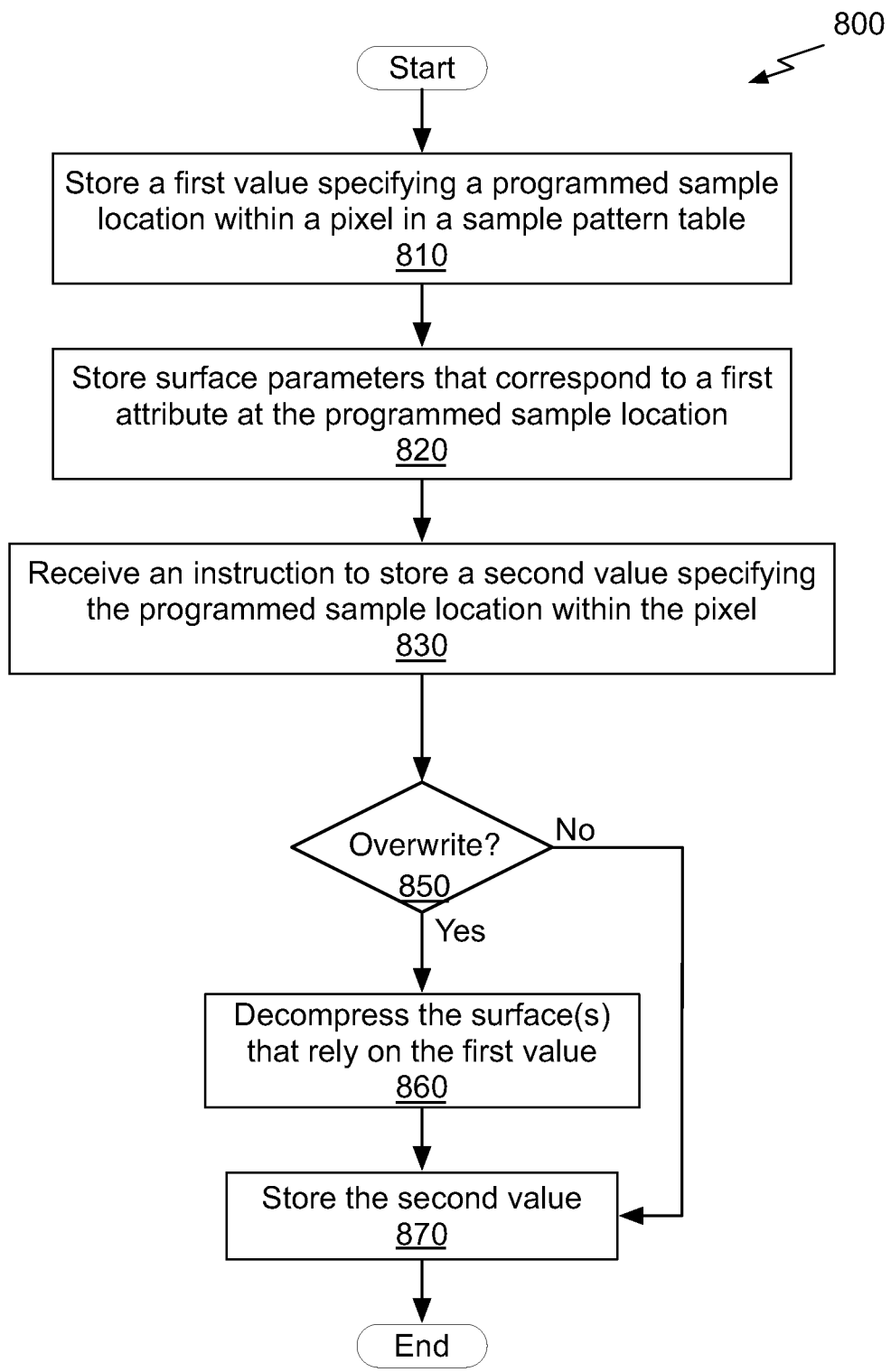
FIG. 8 illustrates another flowchart of a method for using compression with programmable sample locations, in accordance with one embodiment.

FIG. 8 illustrates another flowchart of a method 800 for using sample-specific compression with programmable sample locations, in accordance with one embodiment. Performing the method steps, in any order, is contemplated as being within the context of this disclosure. At step 810, a first value specifying a programmed sample location within a pixel is stored in a programmable sample pattern table (i.e., sample pattern table 720, 721, or 722). In one embodiment, a hardware unit 700 (or 702) receives an instruction that causes one or more values to be stored in a programmable sample pattern table. A driver in a host processor may generate the instructions and data to be processed by the hardware unit 700 (or 702). The driver may include an instruction prior to corresponding data for one or more pixels that reconfigures the programmable sample pattern table with new sample location values for one or more antialiasing operations. In one embodiment, the instruction specifies the one or more values to be written to the programmable sample pattern table. In another embodiment, the instruction includes a pointer to a location in a memory that stores a copy of the one or more values to be written to the programmable sample pattern table.

At step 820, surface parameters 770 corresponding to a first attribute at the programmed sample location within a first pixel of a surface are stored in a display surface. At step 830, an instruction to store a second value specifying the programmed sample location within the pixel in the programmable sample pattern table is received by a hardware unit 700 (or 702).

At step 850, the hardware unit 700 (or 702) determines if the second value will overwrite a value that is needed for accessing a display surface, and, if not, at step 870, the second value is stored in the sample pattern table. In the context of the description, the sample pattern table may be one of the sample pattern tables 720, 721, or 722. Whether a value will be overwritten with the second value is determined based on if the display surface is stored using sample-specific-compression and if the display surface is in-use and available to be read. When the display surface is not compressed using sample-specific-compression, the sample pattern values corresponding to the display surface may be overwritten. When multiple sample pattern tables are implemented, as described in conjunction with FIGS. 7A, 7B, 7C, and 7D, the second value may be written to a different sample pattern table, so that the first value is not overwritten.

If, at step 850, the second value will overwrite a value that is needed for accessing a display surface, then, at step 860, one or more display surfaces that rely on the first value are decompressed. In one embodiment, a decompress-in-place operation is performed to reconstruct the attributes stored in the display surface. The decompress-in-place operation is performed by reading the first value from the sample pattern table, reading the surface parameters from the display surface, reconstructing the attribute at a sample location specified by the first value using the surface parameters, and storing the attribute in the display surface. The reconstruction is performed before the first value in the programmable sample pattern table is overwritten by the second value. At step 870, the second value is stored in the first sample pattern table by overwriting the first value in a first sample pattern table or the second value is stored in a second sample pattern table.

Figure 9:
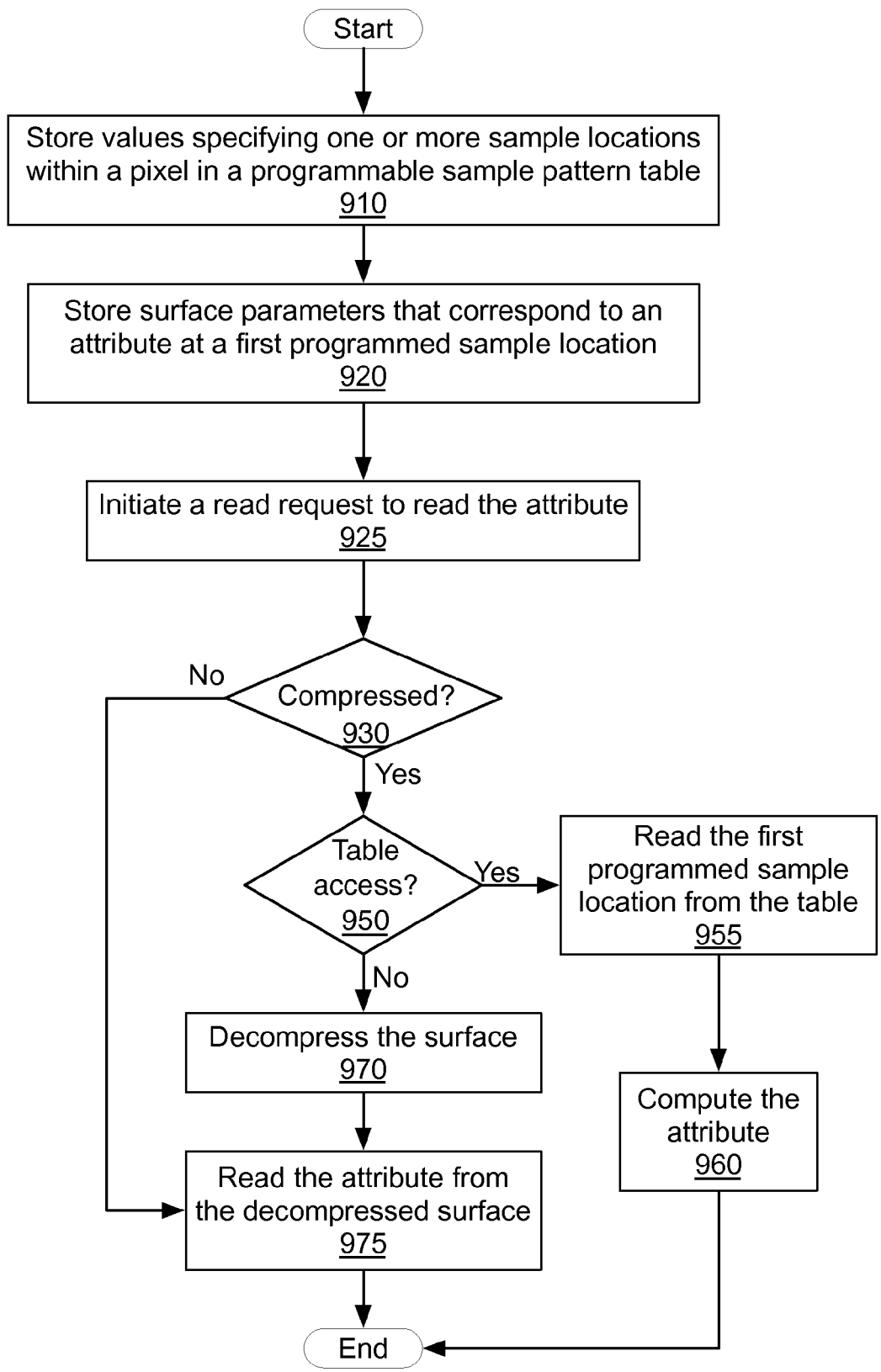
FIG. 9 illustrates a flowchart of a method for reconstructing an attribute value of a surface that is associated with programmable sample locations, in accordance with another embodiment.

FIG. 9 illustrates a flowchart of a method for reconstructing an attribute value of a display surface that is associated with programmable sample locations, in accordance with another embodiment. Performing the method steps, in any order, is contemplated as being within the context of this disclosure. At step 910, a first value specifying a programmed sample location within a pixel is stored in a programmable sample pattern table. In one embodiment, a hardware unit 700 receives an instruction that causes one or more values to be stored in a programmable sample pattern table. At step 920, surface parameters corresponding to a first attribute at the programmed sample location within a first pixel of a surface are stored in a display surface. In one embodiment, the hardware unit 700 may be, e.g., a rasterizer 530, which transmits the instruction to a ZROP engine 512 for performing a Z-test and the ZROP engine 512 stores the surface parameters in a display surface. The hardware unit 700 may also be the hardware unit 702.

At step 925, an instruction to read an attribute is generated by a hardware unit 700 (or 702). At step 930, the hardware unit 700 determines if the display surface is sample-specific-compressed, and, if not, then, at step 975, the attribute is read from the decompressed display surface. Otherwise, at step 950, the hardware unit 700 determines if the sample pattern table may be accessed to obtain the sample location needed to reconstruct the attribute. If the hardware unit 700 can access a sample pattern table then, at step 955, the hardware unit 700 reads the first programmed sample location from a sample pattern table and, at step 960, computes the attribute based on the surface parameters and the first programmed sample location.

If, at step 950, the hardware unit 700 determines that the sample pattern table cannot be accessed by the hardware unit 700 (i.e., the hardware unit is a naïve client), then at step 970 another hardware unit 700 or driver may be configured to perform a decompress-in-place operation to decompress the display surface. At step 975, the attribute is read from the decompressed display surface.

When programmable sample patterns are used in combination with sample-specific compression, support for reconstructing the attributes may be implemented using two different techniques. A decompress-in-place operation may be performed to enable a naïve client to access a sample-specific-compressed display surface, because a naïve client cannot directly access a programmable sample pattern table 720, 721, or 722 that stores a set of sample locations needed to read attributes from a sample-specific-compressed display surface. Examples of naïve clients may include a processor that is external to the PPU 500 that accesses display surfaces stored in memory 204 through the L2 cache 265 and units within the SM 250 that are configured to access display surfaces stored in memory 204 through the Texture Unit/L1 cache 390 and L2 cache 265. Examples of non-naïve clients may include high-performance engines, such as the ZROP engine 512 or a hardware unit 700 which may include one or more sample pattern tables 720. The ZROP engine 512 can access sample-specific-compressed display surfaces stored in memory 204 and perform decompress-in-place.

As described in conjunction with FIGS. 7B, 7C, and 7D, one or more sample pattern tables may be stored in one or more units between a hardware unit 702 that accesses a sample-specific-compressed display surface and the display surface or in the display surface itself (e.g., L2 cache 765, memory interface 780, and memory 704). Each sample pattern table may be associated with one or more display surfaces, and multiple sample pattern tables may be stored so that sample locations may be changed without overwriting sample pattern tables that are still in use. Storing at least one sample pattern table outside of the hardware unit 702 allows reconstruction of attributes stored in a sample-specific-compressed display surface by a naïve client without needing to perform a decompress-in-place for the display surface. However, when the number of sample pattern tables is limited and a sample pattern that is still in use will be overwritten, a decompress-in-place operation may be performed for a display surface before a sample pattern is overwritten with new values.

Figure 10:
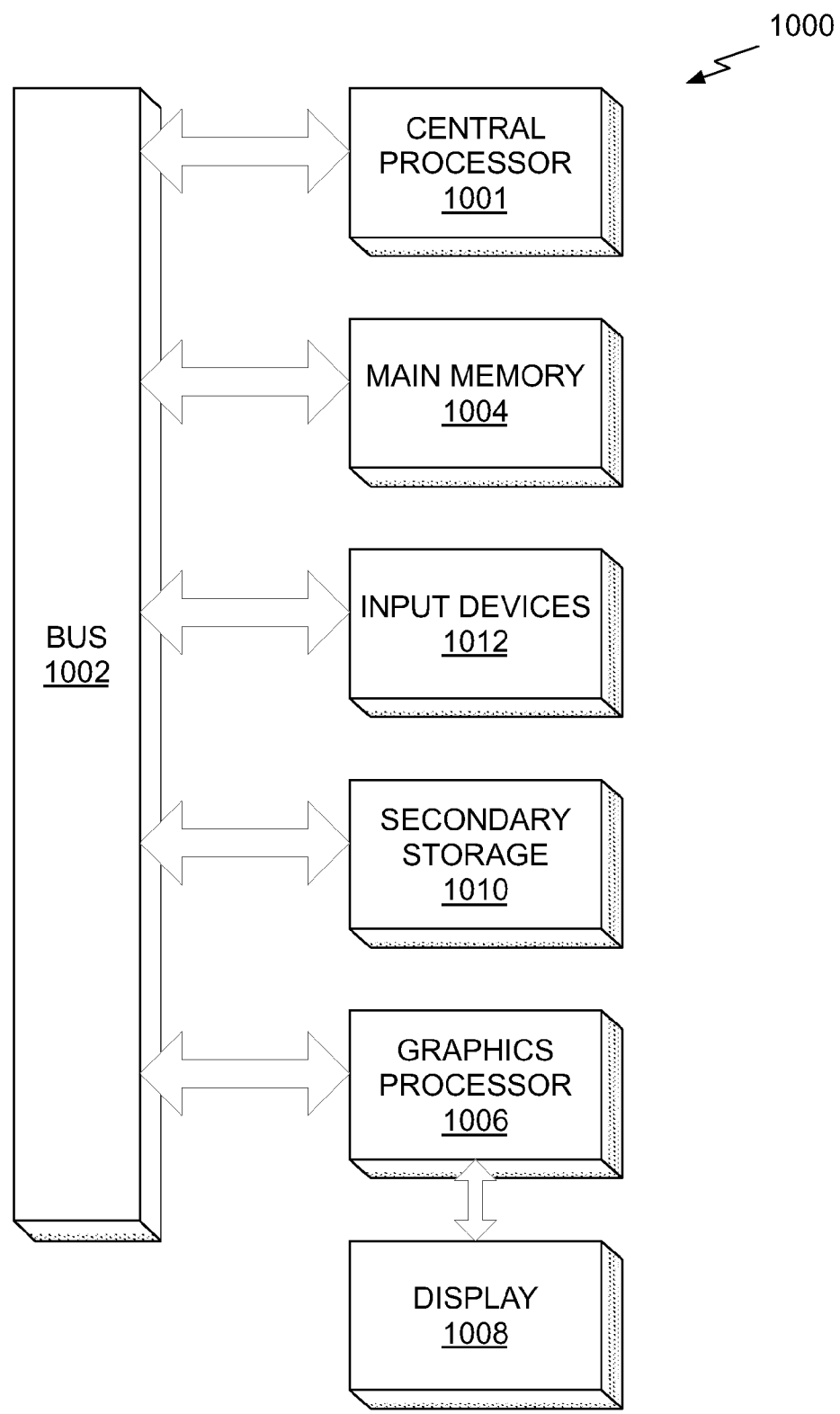
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU). In one embodiment, at least one module in the graphics processor 1006 comprises a hardware unit 700 that includes the programmable sample pattern table 850.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
storing, by a graphics processor, a first value specifying a programmed sample location within a pixel in a sample pattern table;
storing, in a memory, geometric surface parameters corresponding to a first attribute at the programmed sample location within a first pixel of a display surface;
receiving, by the graphics processor, an instruction to store a second value specifying the programmed sample location within the pixel in the sample pattern table;
reading, by the graphics processor, the geometric surface parameters from the memory; and
reconstructing, by the graphics processor, the attribute based on the geometric surface parameters and the first value.

2. The method of claim 1, wherein the reconstructing comprises reading the first programmed sample location from the sample pattern table.

3. The method of claim 1, wherein the sample pattern table is stored in the memory.

4. The method of claim 1, wherein a pointer corresponding to the sample pattern table is stored in a state register associated with the display surface.

5. The method of claim 1, wherein a pointer corresponding to the sample pattern table is stored in a page table associated with the memory.

6. The method of claim 1, wherein the sample pattern table is stored in a. portion of the memory that is allocated to the display surface.

7. The method of claim 1, wherein the sample pattern table is stored in a hardware unit that is configured to operate on per-sample attributes.

8. The method of claim 1, wherein the sample pattern table is stored in a memory interface unit.

9. The method of claim 1, further comprising storing the reconstructed attribute in the display surface.

10. The method of claim 1, further comprising, after reconstructing the attribute, storing the second value specifying the programmed sample location within the pixel in the sample pattern table.

11. The method of claim 1, wherein the storing of the geometric surface parameters and the reconstructing of the attribute are performed by a first processing unit, and further comprising:
initiating a read of the attribute from the memory by a second processing unit;
determining that the attribute is stored in a compressed format represented by the geometric surface parameters;
storing, by the first processing unit, the reconstructed attribute in the memory; and
returning the reconstructed attribute to the second processing unit.

12. The method of claim 11, wherein the sample pattern table cannot be accessed by the second processing unit.

13. The method of claim 1, further comprising:
reconstructing additional attributes based on the additional geometric surface parameters read from the memory; and
storing the reconstructed attribute and the additional reconstructed attributes in the memory.

14. The method of claim 1, further comprising storing additional values specifying one or more sample locations within a second pixel in a second sample pattern table, wherein the display surface is associated with the sample pattern table and a second display surface that includes the second pixel is associated with the second sample pattern table.

15. The method of claim 1, wherein the display surface is partitioned into tiles that each include multiple pixels and the geometric surface parameters, and wherein at least a portion of the sample pattern table is stored in a first portion of the memory that is associated with a first tile that includes the first pixel.

16. The method of claim 15, wherein the geometric surface parameters and the at least a portion of the sample pattern table are stored in a second portion of the memory that is associated with a second tile.

17. The method of claim 15, further comprising storing additional geometric surface parameters and at least a portion of an additional sample pattern table in the first portion of the memory that is associated with the first tile.

18. The method of claim 1, wherein the attribute represents depth.

19. A system comprising:
   a memory configured to store a display surface; and
   a graphics processor that is coupled to the memory and configured to:
      store a first value specifying a programmed sample location within a pixel in a sample pattern table;
      store, in the memory, geometric surface parameters corresponding to a first attribute at the programmed sample location within a first pixel of the display surface;
      receive an instruction to store a second value specifying the programmed sample location within the pixel in the sample pattern table;
      read the geometric surface parameters from the memory; and
      reconstruct the attribute based on the geometric surface parameters and the first value.

20. A non-transitory computer-readable storage medium storing instructions that, when executed by a graphics processor, causes the graphics processor to perform steps comprising:
   storing a first value specifying a programmed sample location within a pixel in a sample pattern table;
   storing, in a memory, geometric surface parameters corresponding to a first attribute at the programmed sample location within a first pixel of a display surface;
   receiving an instruction to store a second value specifying the programmed sample location within the pixel in the sample pattern table;
   reading the geometric surface parameters from the memory; and
   reconstructing the attribute based on the geometric surface parameters and the first value.

* * * * *